Patented May 27, 1930

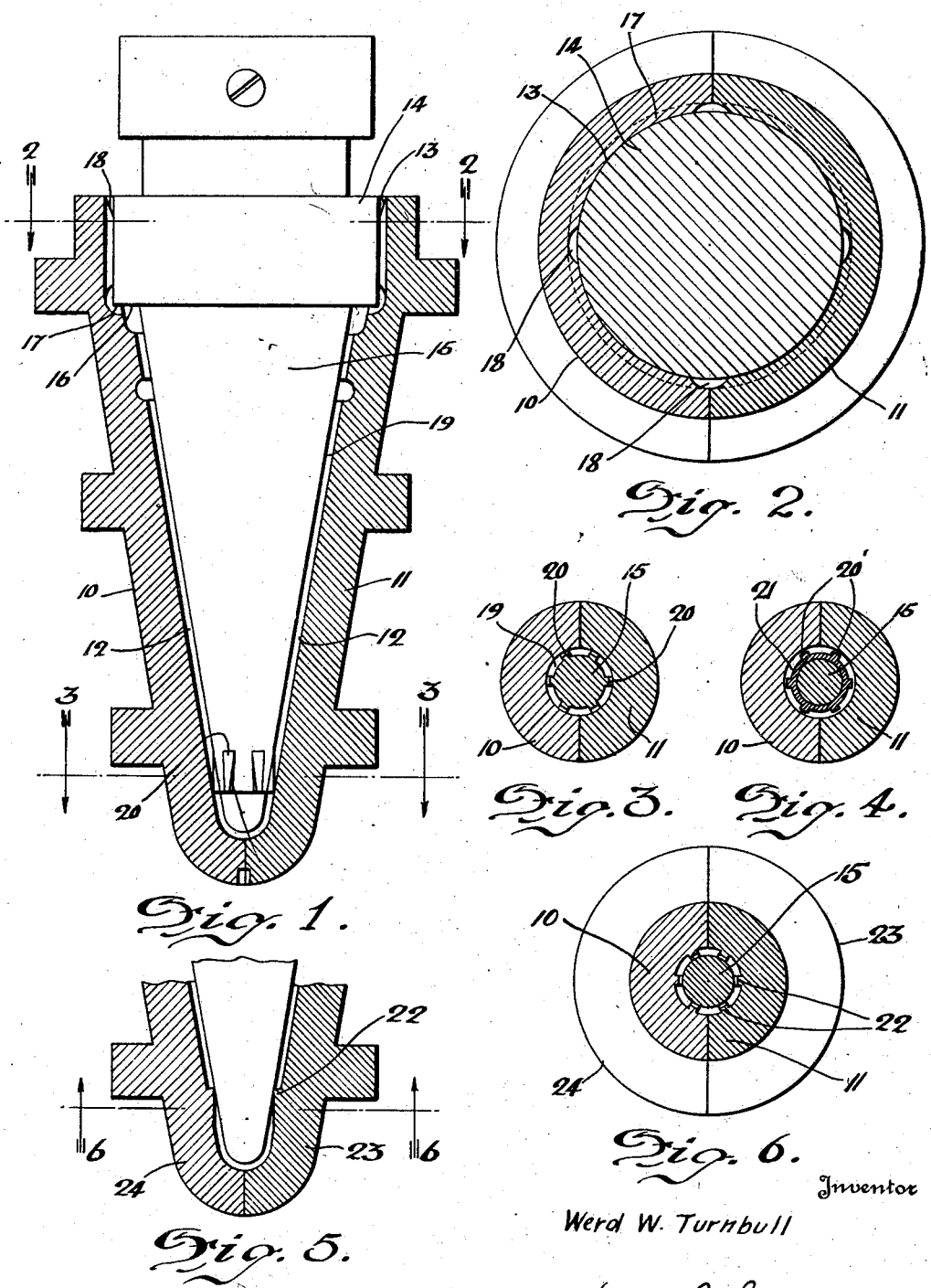

1,759,924

UNITED STATES PATENT OFFICE

WERD W. TURNBULL, OF DAYTON, OHIO, ASSIGNOR TO NATIONAL BISCUIT COMPANY, OF NEW YORK, N. Y., A CORPORATION OF NEW JERSEY

MOLD FOR BAKING CUP PASTRY AND THE LIKE

Application filed November 3, 1927. Serial No. 230,798.

My invention relates to molds for baking cup pastry and the like, and, in the specific form shown and described herein, is embodied in a mold for baking ice cream cones.

In baking cup pastry, and particularly such articles as ice cream cones, the walls of which are relatively thin and the articles very fragile, it has been impossible heretofore to keep the core or inner mold member co-axial with the cavity in the outer mold member. The result being that the unsupported end of the core almost invariably tilts to one side or the other, so that the baked article has one thin side and one thick side. Ice cream cones are usually made with their side walls about one-sixteenth ($\frac{1}{16}$) of an inch in thickness, so that a very slight tilting of the core is sufficient to reduce the thickness of one side to that of a mere skin or shell, and as this thin part will be formed toward the tip or point of the cone, where it is held by the consumer, it is easily broken.

The core or inner mold member is supported entirely from its large end, and various means have been devised for centering the large end of the core in the mold cavity, hoping thereby to hold the core co-axial throughout its length with the cavity in the outer mold member. But such devices have not always been successful because the heads of the cores, (the cylindrical part usually provided on the cores above the conical part that forms the inner part of the cone or other baked article), cannot be made to fit very closely within the top recess of the mold member, but considerable clearance must be allowed for expansion due to heat and working conditions, so that the points of the cores may be tilted out of alinement, with the result that the ice cream cones will be baked thin on one side: This causes a large number of imperfect articles and results in considerable loss to the manufacturer in this highly competitive market.

The principal object of my invention is to provide a means whereby the core or inner mold member will always be held in its proper position in the mold cavity so that the ice cream cones, or other cup pastry, will always be baked with walls of uniform thickness.

With the above, and other objects, in view, as will appear as the specification proceeds, reference will now be had to the accompanying drawings for a full description of one embodiment of my invention in which Fig. 1 is a longitudinal section through a mold for baking ice cream cones showing one form of the invention;

Fig. 2 is a cross section on the line 2—2 of Fig. 1 showing a means for centering the top or large end of the core;

Fig. 3 is a cross sectional view on the line 3—3 of Fig. 1.

Fig. 4 is a view similar to Fig. 3, but showing the centering device formed from a separate piece and secured to the core.

Figs. 5 and 6 are longitudinal and cross sectional views respectively of a modified form of the invention in which the centering device is provided on the outer mold member.

As shown in the drawings, the outer mold member is formed in two parts 10, 11, having semi-conical cavities 12, 12 formed therein, which mate when the mold is closed to provide a conical cavity for forming the outer surface of the ice cream cone which usually has an ornamental pattern or design thereon. At the top, the mold has a cylindrical counter-bore 13 adapted to fit, more or less closely, the cylindrical head 14 of a core or inner mold member 15 that forms the inner surface of the ice cream cone. The lower face 16 of the head 14 rests on a narrow shoulder 17 of the mold member, which, together with the counter-bore keeps the top of the core central in the mold cavity.

Passages 18 are cut in the sides of the counter-bore and shoulder 17 to provide vents for steam and overflow for any excess of batter or dough that may have been supplied to the mold to form the ice cream cone. As shown, there are four of these vents, but any requisite number may be provided.

The core 15 is spaced from the walls of the conical cavity in the mold so that an annular conical space 19 is provided in which the batter is baked to form the ice cream cones. The core extends nearly to the bottom of this space and near its tip is provided with a number of projections or lugs 20 which extend substantially into contact with the walls of the mold cavity. These lugs therefore hold the tip 21 of the core co-axial with the mold cavity and insure the cones being baked with walls of uniform thickness, but are given sufficient taper so that they can be lifted vertically out of the cone without injuring it.

In Figs. 1 and 3, I have shown the lugs 20 as being formed integral with the core 15, but, as shown in Fig. 4, the lugs 20' may be formed on a ring or collar 21 that fits tightly on the core near its tip.

In Figs. 5 and 6, I have shown a further modification of my invention, in which the centering lugs 22 are provided as a part of the mold sections 23, 24, and may be formed integral therewith or secured thereto by any suitable means.

While I have shown my invention applied to a mold adapted to bake the usual conical ice cream cone, it will be understood that it is not limited thereto, but is equally adapted to the "cup" style of ice cream cones, and cup pastry in general. Also, the invention is equally applicable to solid or one piece molds, as well as to the two part or divided mold shown.

In operation, the parts of the mold, (sections 10, 11 and core 15) are heated in the usual manner up to the baking temperature. The core is then lifted out and a measured quantity of batter or dough deposited in the mold cavity. The core is then lowered into place, causing the batter to rise and fill the space 19 to form the ice cream cone. The lugs or projections 20 are of such length that they will very nearly contact with the outer walls of the mold cavity, but the mold having been hot when the batter was supplied to it, a thin film is at once formed on the mold which is not penetrated by the lugs 20, even tho they be of such length as normally to extend into contact with the mold surface, if the cushion or film of batter were not present.

The core is then held down in the mold as long as may be necessary and the batter baked to form the cone. The core is then raised parallel to its axis, the centering lugs 20 being pulled free from the baked cone and leaving slight indentations in the inner surface but no openings or holes through the side walls.

When the centering lugs are provided on the outer mold member, as shown in Figs. 5 and 6, they may be harmoniously worked into the general ornamental design of the cone so as not to leave unsightly marks thereon.

While I have shown and described several specific embodiments of my invention, it will be understood that they are illustrative only, and not to be taken as limitations beyond the scope of my claims. Also, it will be understood that the centering lugs need not be located near the tip of the core, but may be located at any convenient point below the top of the cone where they will perform their function.

What I claim as my invention and desire to secure by Letters Patent is:

1. In a mold for forming cup pastry and the like, an outer mold member having an elongated cavity therein open at one end and closed at the other, an inner mold member insertable through the open end of said cavity and spaced from the side walls thereof, and means on one of said mold members near the closed end of the cavity for holding the inner mold member centrally spaced in said cavity.

2. In a mold for forming cup pastry and the like, an outer mold member having a conical cavity therein open at its large end and closed at its small end, a conical core co-axial therewith and spaced from the walls of the conical cavity, means for holding the large end of the core co-axial with the mold cavity, and another means within the space between the outer member and core for holding the tip of the core co-axial with the mold cavity.

3. In a mold for forming cup pastry and the like, an outer mold member having a conical cavity therein, open at its large end and closed at its small end, an inner conical mold member co-axial therewith, and means carried by one of said mold members adjacent the tip of the conical cavity for holding the tip of the inner mold member coaxial in the cavity.

4. In a mold for forming cup pastry and the like, an outer mold member having a conical cavity therein, a core member insertable in the mold member and spaced therefrom to provide an annular conical space, and means on one of said members projecting into said annular conical space to hold the members in co-axial alignment.

5. In a mold for forming cup pastery and the like, an outer mold member having an elongated cavity therein, an elongated core insertable in the mold member and spaced therefrom to provide an annular space, a plurality of projections on the core wholly within the annular space and adapted to engage the mold member to hold the core centrally of the cavity, whereby the cup pastry will be of uniform thickness.

6. In a mold for forming cup pastry and the like, an outer mold member having a conical cavity therein, a conical core in the mold member and spaced therefrom to provide an annular conical space, means for holding the large end of the core centrally in the conical cavity, and projections on the core for holding the tip of the core centrally in the conical cavity.

7. In a mold for forming cup pastry and the like, an outer mold member having a conical cavity therein, a conical core in the mold member and spaced therefrom to provide an annular conical space, a collar on said core, and projections on said collar extending substantially across said annular space.

8. In a mold for forming cup pastry, an outer mold member having a cavity therein, a core member in the mold member and spaced therefrom to form an annular space, and projections fixed with relation to one of said members wholly within and extending across said annular space substantially into contact with the other member, whereby the core member is held centrally in said mold.

9. In a pastry forming mold, an outer mold member having a pastry forming cavity therein, a core member within the mold member spaced from the cavity walls and adapted to mold the interior walls of the pastry, and spaced centering projections carried by one of the members intermediate the ends of the pastry forming cavity and extending across the cavity substantially into contact with the other member.

10. In a pastry forming mold, an outer mold member having a pastry forming cavity therein, a core member within the mold member spaced from the cavity walls and adapted to mold the interior walls of the pastry, and centering means carried by one of the members intermediate the ends of the pastry forming cavity and extending across the cavity substantially into contact with the other member, said centering means being fixed to the one member and shaped to permit relative lonigtudinal movement with respect to the pastry article.

WERD W. TURNBULL.